UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

LIGHTNING-ARRESTER.

989,487. Specification of Letters Patent. Patented Apr. 11, 1911.

Application filed August 26, 1909. Serial No. 514,672.

*To all whom it may concern:*

Be it known that I, ELMER E. F. CREIGHTON, a citizen of the United States, residing at Schenectady, in the county of Schenectady, State of New York, have invented certain new and useful Improvements in Lightning-Arresters, of which the following is a specification.

My invention relates to lightning arresters and more particularly to lightning arresters of the type in which a number of electrolytic cells or condensers are connected between the conductors of the system to be protected and ground.

Electrolytic cells or condensers when used as lightning arresters for a transmission line are generally connected to the conductors of the transmission line through spark gaps set to break down at voltages slightly above the normal potential of the system whereby the abnormal potential discharges through the spark gap and the aluminum arrester to ground. Under these conditions the electrolytic cells are normally entirely disconnected from the line and the film on the electrodes of the cells gradually deteriorates, so that it is necessary to pass current through the cells at intervals in order to maintain the cell in good condition, and as the cells are proportioned to break down at a voltage somewhat higher than the normal voltage of the transmission system the full potential of the system must be applied in order to send enough current through the cell to build up the film. It is also customary on a polyphase transmission system to provide as many electrolytic cells as there are conductors, each cell being connected at one terminal to the conductor and the other terminals being electrically connected at a common or neutral point, which in turn is connected to ground through an additional or ground cell. With this arrangement it is easy to apply the normal potential of the system to the cells which are directly connected to the conductors, but it is difficult to send enough current through the ground cell to keep its film in good condition, and the object of my invention is to arrange the connections of the electrolytic cells in such a manner that the ground cell may be subjected to the normal potential of the line and thereby all of the cells be kept in good condition; to provide an improved form of transfer switch for controlling the connections of the cells to ground and to the conductors, and in general to improve the construction of lightning arresters of the electrolytic type.

In carrying out my invention I provide a selective controlling or switching mechanism for the condensers by means of which the operator can arbitrarily select a cell and connect it as a ground cell while the remaining cells are connected to the conductors. If the film on the ground cell deteriorates, another cell can be connected in as the ground cell while the one which was first used as the ground cell is connected to the line and by transposing the cells and charging them in the usual way, the films in all the cells can be kept in good condition. In the preferred construction, two cells are mounted side by side and are alternately used as ground cells, while the remaining cells which constitute the arrester are directly connected to the conductors. By means of a suitable control or switching mechanism either one of the two above mentioned electrolytic cells may be connected to ground, while the other one is connected to one of the conductors of the transmission system. Whenever the operator desires to do so the switch mechanism may be manipulated to interchange the connections so that the cell which was the ground cell is directly connected to the conductor and the other cell becomes the ground cell. Various forms of switching mechanism may be used for accomplishing this purpose, but in the preferred construction the switch is a rotatable switch mounted between the two electrolytic cells and provided with switch blades which coöperate with the terminals of both cells, one of the switch blades being grounded and the other connected to the conductor of the transmission system, so that the relation of the two cells to ground and to the conductor may be transposed by altering the position of the switch.

My invention will best be understood in connection with the accompanying drawings which show, merely for purposes of illustration, one of the many forms in which my invention may be embodied and in which—

Figure 1 is a diagrammatic view showing my invention embodied in an electrolytic ar- C. R. DICK.
AUTOMATIC SAFETY AIR AND STEAM COUPLING.
APPLICATION FILED APR. 20, 1910.
989,489.
Patented Apr. 11, 1911.
2 SHEETS—SHEET 2.
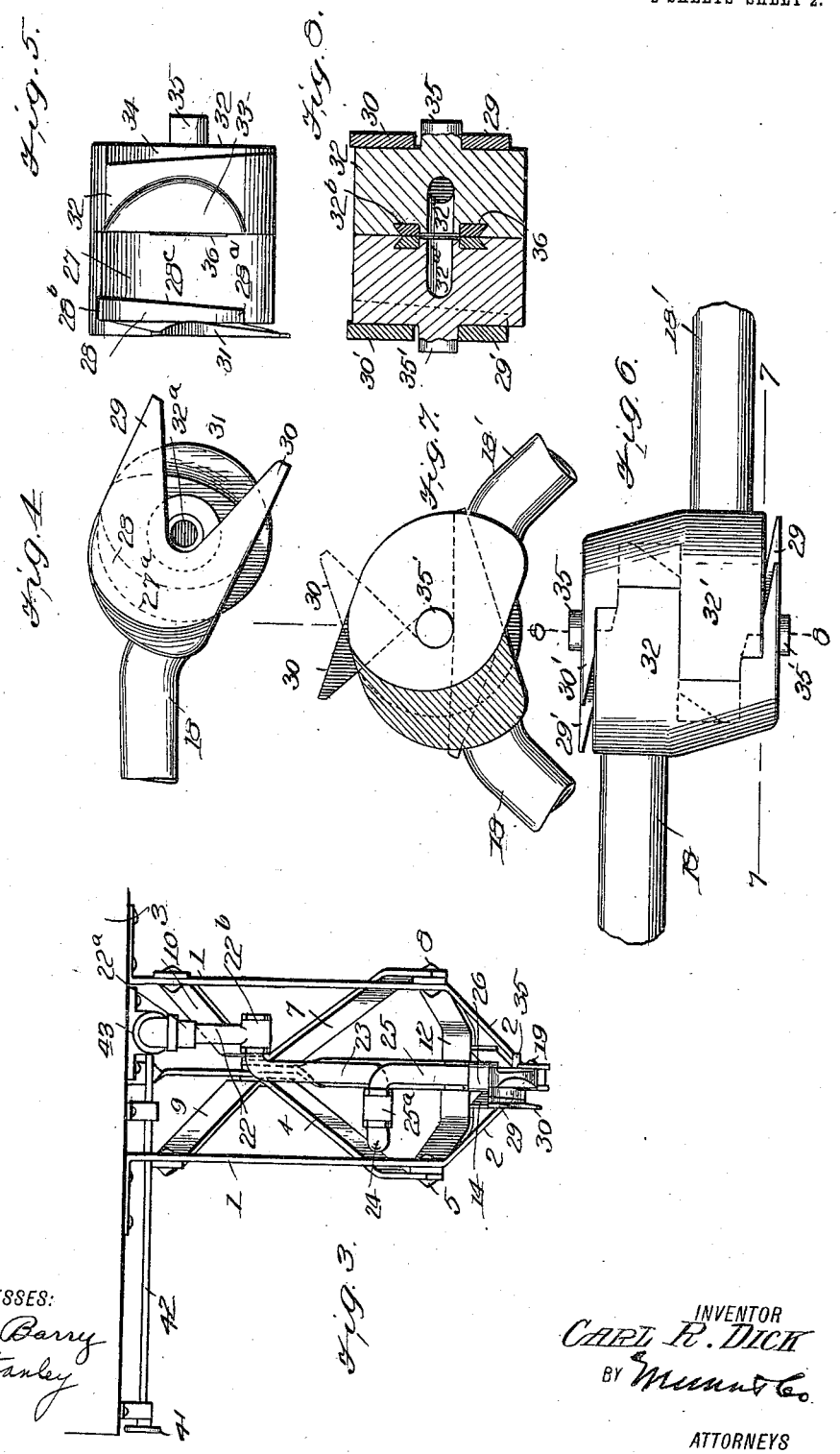
WITNESSES:
F. C. Barry
L. A. Stanley
INVENTOR
Carl R. Dick
BY Munn & Co.
ATTORNEYS

UNITED STATES PATENT OFFICE.

CARL R. DICK, OF NEW SMYRNA, FLORIDA.

AUTOMATIC SAFETY AIR AND STEAM COUPLING.

989,489.     Specification of Letters Patent.     Patented Apr. 11, 1911.

Application filed April 20, 1910. Serial No. 556,488.

*To all whom it may concern:*

Be it known that I, CARL R. DICK, a citizen of the United States, and a resident of New Smyrna, in the county of Volusia and State of Florida, have made certain new and useful Improvements in Automatic Safety Air and Steam Couplers, of which the following is a specification.

My invention relates to improvements in automatic safety air or steam couplers that are designed to be used on railways, and it consists of the combinations, constructions and arrangements herein described and claimed.

An object of my invention is to provide a device in which the coupling heads are held in operative position when the cars are uncoupled, and which, when the cars come together automatically engage each other and form a steam or air tight joint.

A further object of my invention is to provide for a relative movement of the coupler supporting means with the car itself, thereby rendering the device of an elastic nature, and preventing the shocks and jars, which might occur if this movement was not permitted.

A further object of my invention is to provide a flexible metal connection from the coupler head to the train pipe which will permit the head to move as in the act of coupling.

A further object of my invention is to provide a novel form of coupler head.

Other objects and advantages will appear in the following specification and the normal features of the device will be particularly pointed out in the appended claims.

My invention is illustrated in the accompanying drawings, forming part of this specification, in which similar reference characters denote like views in the several parts, and in which—

Figure 1 is a side view, showing my device as applied to two cars, the apparatus being in its normal position by disuse, Fig. 2 is a similar view, showing the position of the apparatus when the cars are coupled, Fig. 3 is a front view of the apparatus in its normal position of disuse, Fig. 4 is a side view of one of the coupler heads, Fig. 5 is a front view of the head shown in Fig. 4. Fig. 6 is a plan view, showing the two coupler heads joined, Fig. 7 is a section along the line 7—7 of Fig. 6, and Fig. 8 is a section along the lines 8—8 of Fig. 6.

Referring now, particularly, to Figs. 1, 2 and 3, I have shown therein the main supporting members for my improved coupler. These consist of a stirrup 1, having a V-shaped central portion 2 (see Fig. 3), the upper ends of the stirrup being attached to the bottom of the car 3. A diagonal brace member 4 is secured to the stirrup 1 at 5, its other end being secured to the bottom of the car at 6. A brace 7 is connected to the opposite side of the stirrup by a bolt or rivet 8. The braces 9 and 10 are connected to opposite sides of the stirrup 1, and are secured to the member 4 by means of a bolt or rivet 11. At 12 is another stirrup shaped member, which is secured by means of the fastenings 5 and 8, and which is held rigidly at its other end by means of a brace 13, which is secured by means of the fastening member 11. This construction just described provides a light, yet rigid frame for holding the coupling members.

Referring now to Fig. 1 it will be seen that I have provided a V-shaped sliding member 14, arranged to rest in the angle of the stirrup shaped member 1. One end of this sliding member is secured to a rod 15, which passes through an opening 16 at the central portion of the stirrup shaped member 12, this opening 16 being sufficiently large to permit play of the rod 5. The coupling head 17 is carried on the end of a rod 18, which is pivoted at 19 to the end of the sliding member 14. The member 18 is hollow from the head down to a laterally extending pipe 20 with which it communicates. The part of the rod 18, which is secured by means of the pivot 19, being solid.

The connection between the train pipe 21 and the pipe 20, which communicates with the coupler head 17, is shown in Figs. 1, 2 and 3. The pipe 21 is provided with a downwardly turned elbow 21$^a$. Secured to the elbow 21$^a$ is a pipe section 22 having a swivel connection 22$^a$, giving the pipe a movement around a vertical axis. The pipe 22$^a$ has a lateral bend 22$^b$ at its bottom (see Fig. 3). To this pipe is attached a pipe 23 by means of a swivel 23$^a$. The pipe 24 is attached to the pipe 23 by means of a swivel 24$^a$, while the pipe 25 is attached to the pipe 24 by means of a swivel 25$^a$, and to the pipe 20 by a swivel 26. It will be seen, from this construction, that the connection between the head 17 and the train pipe permits of a universal movement.

The coupler head is shown in detail in Figs. 4, and 5, it consists of a block of metal of the shape shown in the figures, having a deep recess 27 with a curved bottom 27$^a$ (see Figs. 5 and 4). Toward one side of this recess is left a shoulder 28. The bottom of this shoulder 28$^a$ is narrower than the top 28$^b$ to leave a cam surface 28$^c$. Adjacent the shoulder 28 are the extensions 29 and 30, these extensions being separated by a V-shaped opening 31. On the opposite side of the cut-away portion 27, forming the extensions 29 and 30, is the main portion of the head 32. This has a beveled portion 33 on one side and is cut-away on the other side to leave a shoulder 34. A cylindrical lug 35 extends from the member 32. The member 32 is provided with a central opening 32$^a$ through which the air or steam passes. Around this central opening is an annular dovetail socket 32$^b$ for the reception of the resilient gasket 36 (see Fig. 8).

From the foregoing description of the various parts of the device the operation thereof may be readily understood. The normal positions of the apparatus on two cars, which are about to be coupled, is that shown in Fig. 1. In this position it will be seen that the sliding member 14 is held in a forward position by means of a spiral spring 40, which surrounds the rod 15, and bears upon the end of the sliding member 14 at one end, and the braces 12 and 13 at the other. The sliding member 14 rests at the bottom of the U-shaped stirrup 1. The head 17 is held in the position shown in the figure, the head 17′ on the car 3′ being pointed toward the head 17. As the cars come together the lug 35′ of the head 17′ will enter the opening 31 between the extensions 29 and 30, while the lug 35 on the head 17 will enter between the corresponding extensions 29′ and 30′ of the companion head. In order to guide the heads into position, I have provided the beveled faces corresponding to 33 (see Fig. 5) so that the heads may be out of alinement, and yet be guided into alinement. The body portion 32 of the head 17 (see Fig. 5) will enter the recess 27′ corresponding to the recess 27, while the body portion 32′ of the head 17′ will enter the recess 27 of the head 17. Now as the cars continue to come together the members 18 and 18′ will be swung upwardly on their pivots and the portion of the member 32′ of one head will be cammed by the cam surface 28$^c$ on the other head so as to bring the heads together in the position shown in Fig. 8. The openings 32$^a$ and 32$^{a′}$ are then in registration. As the rods 17 and 17′ are raised, the pipes 18 which are pivoted at 19, reach a position approximately at right angles to the member 14, being prevented from further movement by the shoulder 19′. The sliding members 14 and 14′ will be raised at their forward ends by a further movement of the cars toward one another into the position shown in Fig. 2. The springs 40 and 40′ will be compressed, and will, therefore, tend to hold the heads together. The movement of the heads will cause a movement of the flexible connection between the heads and the train pipe, but as stated above, its movement is permitted by the swivel connections already described.

The air in the train pipe may be turned on by means of a hand wheel 41 at the end of a rod 42 which operates a valve 43 (see Fig. 3). There is, therefore, no danger which might result if the trainman had to go under the car to operate the valve.

When it is desired to uncouple the cars there is no necessity for the trainman entering between the cars, for as the main coupling is operated to release the cars the movement of one car away from the other will permit the heads to operate in the reverse manner from that already described, bringing them back into their normal positions, shown in Fig. 1, and permitting the coupling heads to pull apart.

I claim:—

1. In an automatic air or steam coupling device, a frame comprising a V-shaped support, a V-shaped slidable member carried by said support, a coupler head pivotally connected with said slidable member, a spring for keeping said slidable member in an extended position, a train pipe and flexible pipe connections between said head and said train pipe.

2. In an automatic air or steam coupling device, a frame comprising a V-shaped support, a rearwardly extending brace secured thereto and provided with an opening, a V-shaped slidable member carried by said support, a rod secured to one end of said slidable member and arranged to pass through the opening in said brace, a spring carried by said rod and arranged to bear at one end on said slidable member and at the other on said brace, a coupler head pivotally connected with said slidable member, a train pipe, a series of pipe sections between said head and said train pipe, and swivel joints for connecting the pipe sections.

3. In an automatic air or steam coupling device, a frame comprising a V-shaped support, a rearwardly extending brace secured thereby and provided with an opening, a V-shaped slidable member carried by said support, guiding means for said V-shaped member, a coupler head, a pipe pivoted to said V-shaped support and secured to said coupler head, a train pipe provided with a valve, a laterally extending valve rod, and a hand wheel operating said valve rod.

4. The combination with a pair of cars, each provided with a train pipe and a supporting frame secured to the body of the cars, of a slidable V-shaped member normally carried by each of said frames and adapted to be raised therefrom, a coupler head pivotally carried by each of said slidable members and adapted to engage the other coupler head when the cars come together, and to be turned relative to the other head on its pivot, and means carried by the heads for locking them together by the turning movement, said slidable members being raised from their supporting frames during the locking movement.

CARL R. DICK.

Witnesses:
 JOHN McCORMICK,
 WILLIAM C. WELLS.

Copies of this patent may be obtained for five cents each, by addressing the "Commissioner of Patents, Washington, D. C."